United States Patent [19]

Miyamichi et al.

[11] Patent Number: 5,512,351

[45] Date of Patent: Apr. 30, 1996

[54] PREPREG, PROCESS FOR PREPARATION OF PREPREG, AND PRODUCTS DERIVED THEREFROM

[75] Inventors: Kazuo Miyamichi; Hiroyuki Nakamura, both of Shizuoka, Japan

[73] Assignee: Nikkiso Company Limited, Tokyo, Japan

[21] Appl. No.: 267,204

[22] Filed: Jul. 6, 1994

[30] Foreign Application Priority Data

Dec. 28, 1993 [JP] Japan .................... 5-336981

[51] Int. Cl.⁶ ..................................................... B32B 3/00
[52] U.S. Cl. ..................... 428/195; 427/228; 427/387; 428/224; 428/232; 428/245; 428/260; 428/269; 428/290; 428/294; 428/367; 428/391; 428/447; 428/902
[58] Field of Search .......................... 427/228, 387; 428/224, 232, 245, 260, 269, 290, 294, 367, 391, 447, 902, 195

[56] References Cited

U.S. PATENT DOCUMENTS

| | | | |
|---|---|---|---|
| 4,460,640 | 7/1984 | Chi et al. ................. | 428/224 |
| 4,471,007 | 9/1984 | Pate .......................... | 427/387 |
| 4,911,992 | 3/1990 | Haluska et al. ........... | 427/228 X |
| 5,387,480 | 2/1995 | Haluska et al. ........... | 427/228 X |

FOREIGN PATENT DOCUMENTS

| | | |
|---|---|---|
| 0125005 | 11/1984 | European Pat. Off. . |
| 63-16350 | 4/1988 | Japan . |
| 63-282131 | 11/1988 | Japan . |
| 377138 | 12/1991 | Japan . |
| 9222509 | 12/1992 | WIPO . |

OTHER PUBLICATIONS

Hoyt et al., *Chemical Vapor Infiltration of Silicon Nitride Matrix Composites*, Sampe Journal, vol. 27, No. 2, pp. 11–17, Mar./Apr. 1994.

Newkirk et al., *Formation of Lanxide™ ceramic composite materials*, J. Mater. Res., vol. 1, No. 1, pp. 81–89, Jan./Feb. 1986.

Doughan et al., *Interfacial Properties of C–Coated Alumina Fiber/Glass Matrix Fiber Composites*, Ceram. Eng. Sci. Proc., vol. 10, No. 7–8, pp. 912–924, 1989.

Okamoto, *Use of Organic Metal Polymer for Composite Materials*, Journal of Japan Composite Material Society, vol. 11, No. 3, pp. 15–24, 1985.

Chen et al., *Fibre Reinforced Alumina Ceramic Composites By Sol–Gel Processing*, ECCM-3, vol. 20–23, pp. 87–92, Mar. 1989.

Hurwitz et al., *Polymer Derived Nicalon/Si—C—O Composites: Processing and Mechanical Behavior*, Ceram. Eng. Sci. Proc., vol. 10, No. 7–8, pp. 750–763, 1989.

Brown, Jr., *Double Chain Polymers and Nonrandom Crosslinking*, Journal of Polymer Science: Part C, No. 1, pp. 83–97, 1963.

Shinohara, *New Mechanical Engineering—New Material Series/Composite Materials 4th*, Nikkei Mechanical, pp. 114–120, 11 Dec. 1989.

*Primary Examiner*—Michael Lusignan
*Attorney, Agent, or Firm*—Browdy and Neimark

[57] ABSTRACT

A new prepreg material having good tack drape properties and feasible out-time and articles derived therefrom as well as processes for preparation these products are disclosed. The prepreg is prepared by impregnating inorganic fibers with a compostion comprising:

(A) fine powder of a metal oxide or oxides having an average particle diameter of not larger than 1 μm, (B) a soluble siloxane polymer having double chain structure, (C) a trifunctional silane compound having at least one ethylenically unsaturated double bond in the molecule thereof, (D) a organic peroxide, (E) a radically polymerizable monomer having at least two ethylenically unsaturated double bonds; and heating the impregnated fibers.

21 Claims, No Drawings

PREPREG, PROCESS FOR PREPARATION OF PREPREG, AND PRODUCTS DERIVED THEREFROM

FIELD OF THE INVENTION

This invention relates to prepreg, process for preparation of prepreg, cured prepreg articles, fired prepreg articles, process for preparation of fired prepreg articles and process for densifying fired prepreg articles.

PRIOR ART

Ceramics are advantageous in that they have excellent heat resistance, high temperature strength, oxidation resistance, abrasion resistance, etc. in comparison with organic materials and metallic materials while they have defect that their fracture toughness is inferior. Therefore, measures for improving their fracture toughness, i.e., toughening ceramics without sacrificing their excellent properties are sought after. That is, particulate dispersion method, reinforcement with whiskers or short fibers as well as reinforcement with continuous fibers are being studied.

The particulate dispersion method and reinforcement with whiskers or short fibers have a defect that once local fracture happens, the fracture instantly propagates over the whole body even if the material is toughened.

In contrast, reinforcement with continuous fibers has more remarkable effect of improving fracture toughness. In ceramics reinforced with continuous fibers, the fibers carry applied load and, therefore, fracture does not instantly propagate and overall fracture is foreseen before it actually happens. The foreseeability of fracture is a great advantage in practical use of a material.

However, yet there is no practically usable continuous fibers which maintain sufficient strength at a temperature of 1,200° C. or higher to which the fibers are exposed in air or a temperature of 1,400° C. or higher in an inert gas when the fibers are used for reinforcement of a material. Therefore, it is desired to develop a process for preparing fiber-reinforced composite articles at temperatures of not higher than 1,200° C., preferably not higher than 1,000° C.

A great manufacturing cost reduction is no doubt expected if a process for preparing fiber-reinforced ceramic composite articles at lower temperatures is developed. Also, in order to manufacture articles of curved surfaces or complicated configuration or shape, it is desirable to laminate prepreg units having good tack and drape properties and shape the laminated body into a desired form. Further it is desirable that firing of the shaped bodies can be carried out not in vacuum or inert gas atmosphere but in air and shaped bodies can be fired in the free-standing condition, i.e., off-tool condition.

Methods by which ceramic matrix is formed between or among reinforcing fibers are known. Chemical vapor infiltration (CVI), directed metal oxidation, etc. are employed therefor. These methods are applicable to not only bundles and fabric of continuous fibers but also to those of short fibers and whiskers.

In the CVI, a ceramic material is deposited or precipitated as a matrix between or among the bundle or preform of fibers. (Refer to J. T. Hoyt et al., SAMPE J., 27, No. 2, p.11 (1991), for instance.) Although this process in advantageous in that a ceramic matrix is formed at a relatively low temperature of 1,000 to 1,200° C., it not only takes as long a time as 100 hours but voids are formed with a high void fraction and the process is not easily applicable to complicated configurations or shapes.

In the directed metal oxidation process, a preform of reinforcing fibers is contacted with a molten metal and the metal is converted to a ceramics by oxidation or nitriding. Refer to S. Newkirk et al., J. Mater. Res., 1, p. 81 (1986) for instance.) Although this process is advantageous in that various ceramic matrices can be formed by varying species of metal and atmosphere, the metal often remains in the product and there is a tendency that the strength of the products drops at high temperatures. Manufacturing of products of complicated form is technically limited.

Slurry impregnation process, sol-gel process, polymer pyrolysis process are known as processes for manufacturing ceramic articles reinforced with continuous fibers. In these processes, units of the prepreg, which has been traditionally employed in the field of composite materials, are laminated and formed into the shape of a product and then fired to convert the matrix to a ceramics.

The slurry impregnation process comprises impregnating fibers with a slurry containing fine particles of a ceramics and a binder such as organic polymer to form prepreg, removing the binder and hot-pressing the prepreg in an inert gas atmosphere. This process is described in C. A. Doughan et al., Ceram. Eng. Sci. Proc., 10, p. 912 (1989), for instance. Although this process is advantageous in that fiber-reinforced ceramic products having excellent mechanical properties can be produced, a high temperature such as 1,500 to 1,800 °C. and a high pressure such as 100 to 350 kg/cm$^2$ are required, which inevitably causes deterioration of reinforcing fibers other than carbon fibers. Also when the binder is removed, organic materials are charred, vaporized or suffer thermal shrinkage, which invites deterioration of performance of the matrix and causes cracking and formation of voids.

In this process, water, which is inexpensive and easily removable because of its low boiling point, is used as a medium. But there is a problem that water is strongly adsorbed on the precursor materials for ceramics such as metal oxides, and the adsorbed water cannot be easily removed. Also this prepreg has no tack property.

The sol-gel process generally means a process in which a metal alkoxide, which is a liquid material, is hydrolyzed and condensed in the presence of an acid or a base and thus the sol state is converted to the gel state and the material is converted into a ceramics by application of heat. In this process, ceramics can be formed at a temperature of not higher than 1,000° C.

The defect of this process is that remarkable shrinkage occurs when a wet gel is converted to a xerogel and formation of voids, cracking and fracture occur when the gel is fired to form a ceramics. The shrinkage reaches several tens percent in some cases, which causes cracking between the fibers that do not shrink and the matrix. (Refer to Japanese Laid-Open Patent Publication No. 63-282131 (1988).)

The polymer pyrolysis process is a process in which fibers are impregnated with a matrix precursor of organometallic compounds such as polycarbosilane, polysilazane, etc. to form sheets of prepreg, they are laid up into a laminate, the laminate is shaped, cured and fired. This process is disclosed in Kiyoto Okamoto: "Nippon Fukugozairyogakkaishi", 11, p.99 (1985) and others. This process is advantageous in that the organometallic compounds can be converted to ceramics at temperatures of not higher than 1,200° C., but considerable thermal shrinkage occurs when the organometallic polymer is converted to ceramics by pyrolysis. Also these organometallic polymers do not provide required tack and, therefore, there is difficulty in shaping.

Examples of preparation of ceramics articles renforced with continuous fibers utilizing the above-described three processes are disclosed in the following publications.

M. Chen et al. made fiber-reinforced ceramics by impregnating carbon fibers or silicon carbide fibers with a sol liquid mainly comprising boemite and alumina powder having a particle diameter of 0.5 μm, drying the impregnated fibers at 50° C. over 20 hours, heating them to 1,000° C., cooling them and hot-pressing them in a graphite die at 1,200° C. The thus prepared composite body was porous. The authors concluded that the cause was the remarkable shrinkage which happened during the heating and sintering. (Refer to Agenda of ECCM-3, p. 89, 20–23 March, 1989.)

F. I. Hurwitz et al. prepared a prepreg using polysilsesquioxane as a matrix precursor and silicon carbide fibers as reinforcing fibers by the filament-winding process. They laid up a plurality of the thus prepared prepreg sheets in a metal die, kept the resulting laminate at 70° C. under a pressure of 689 Pa for 2 hours, further heated it to 180° C. for 1.5 hours and kept it at that temperature. They took out this laminate and heated it to 525° C. 1,000° C. 1,200° C. in an argon stream. They recognized that the thermal shrinkage in heating was 19% with respect to polyvinyl(50)-methyl( 50)-silsesquioxane, 13% with respect to polyphenyl (50)methyl(50)silsesquioxane and a number of cracks were formed on the matrix surface and interfiber matrix regions. (Refer to Ceram. Eng. Sci. Proc., 10, 750 (1989).

Frank K. Chi et al. disclosed a process for fiber-reinforced ceramics in which a prepreg was prepared by impregnating high modulus fibers with thermosetting organosilicone resin dissolved in an organic solvent, the thus prepared prepreg was partially cured (B-staging) at a temperature of not higher than 300° C., cured, post-cured and fired at a temperature of not lower than 1,000° C. in vacuum or in an inert atmosphere. (Refer to Japanese Patent Application Publication No. 63–16350.)

The same inventors also prepared fiber-reinforced ceramics by impregnating high modulus fibers with a mixture of a sol of organosilsesquioxane and a colloidal metal oxide or oxides or a mixture of a sol of organosilsesquioxane and a metal alkoxide or alkoxides, curing and firing the resulting prepreg in the same manner as described above. (Refer to Japanese Patent Application Publication No. 3–77138.)

Their processes resemble those using carbon fibers/epoxy resin prepreg. However, their prepregs have no tack and, therefore, handling is difficult in manufacturing articles of curved surfaces and of complicated configurations, and thus their prepregs are apt to suffer delamination. Also they have high flow and, therefore, are difficult to handle when not cured at least partially. Therefore, three step curing including the pre-curing and post-curing is required and this means that their processes require time and labor. Moreover, firing is limited to that in vacuum or in an inert atmosphere and they apparently invites increase in manufacturing cost.

Jong-Hoon Han et al. disclosed a binder composition for ceramics having tack and drape. This composition comprises a polymer such as polymethyl methacrylate, a monomer such as trimethylolpropane trimethacrylate, a peroxide such as dicumyl peroxide and a solvent such as acetone. They also disclosed a process for preparing fiber-reinforced ceramics which comprises mixing the binder composition and a ceramic component such as alumina to obtain a slurry, impregnating inorganic fibers such as alumina fibers with the resulting slurry, curing the fiber mass at 149–170 ° C., removing the binder by heating the fiber mass at a temperature of not higher than 480° C. and sinter the fiber mass at a temperature of 500° to 2,500° C. (Refer to WO092/22509.)

In this process, a crosslinking agent/co-agent system which is conventionally used in vulcanization of rubber or crosslinking of organic polymers (Refer to Takuma Matsumoto: "Gomu to Yukikasankabutsukaryu to kyokakyozai (Rubber, Organic Peroxide Vulcanization and Co-Crosslinking Agent)" published Oct. 10, 1977, published by Taiseisha.) was used as a binder for ceramic particles. In contrast to the binder of the ceramic precursors, this binder gives tack and drape to the resulting prepreg, and, therefore, it is expected that the resulting prepreg has good shapability. But this binder is not different from the conventional polymer binder used in the conventional slurry impregnation process in that the binder comprises only organic materials. Therefore, after the binder is removed by pyrolysis, bonding between the ceramic particles is lost and fiber-reinforced ceramics cannot be obtained unless high-temperature high-pressure sintering as used in the conventional slurry impregnation process is employed.

As has been described above, conventional processes for preparation of shaped reinforced ceramic bodies have the following problems.

(1) High temperature is required for sintering.

(2) Long period of time is required for preparation.

(3) Firing under normal pressure, especially under the free standing condition is difficult.

(4) Manufacturing of articles of complicated configuration is difficult.

(5) Expensive inert gas must be used.

(6) Shrinkage of matrix material during the heating for converting to ceramics is remarkable and the difference in the dimensional change between the reinforcing fibers and the matrix material in heating is remarkable, which causes formation of numberless cracks.

These are disadvantages in commercial production and commercialization of products, which have prevented practical use of ceramic composite materials and articles.

The present invention is intended to solve the above problems and to provide a prepreg which comprises inorganic fibers and a specified ceramics-forming matrix composition, is provided with excellent tack, drape and feasible out-time and is able to form complicated configuration; cured prepreg articles having a strong crosslinked structure prepared by heating said prepreg under pressure; fiber-reinforced ceramic articles which are prepared by firing said cured prepreg articles and whose shinkage during firing is small; processes for preparing said prepreg and articles as well as a process for densifying the fired prepreg articles in order to fill voids formed during the firing so as to improve the strength of the fired articles.

DISCLOSURE OF THE INVENTION

We made an intensive study and succeeded to obtain a prepreg having tack, drape and out-time of the level similar to those of the prepreg in which epoxy resin is used, by saturating tow or fabric of inorganic fibers with a specified matrix composition or thermally infiltrating the matric composition into the tow (a bundles of fibers) or fabric.

The prepreg of the present invention is able to form laminated bodies of complicated configuration and can be formed by heating and pressing under the same conditions as in the case with the prepreg for epoxy resin composite articles, wherein the matrix composition is strongly crosslinked and the prepreg body is converted into a cured prepreg body. The cured body has higher heat resistance than the fiber-reinforced epxy resin composite materials now widely used, and has practical utility per se. The cured body can be converted to a fiber-reinforced ceramic body by firing it under normal pressure and the free-standing condition in air, which is industrially advantageous. The fired body is almost free from shrinkage and does not suffer change in the shape during the firing. The term "free standing condition" used herein means a condition under which the cured body is fired without being fixed in a metal mold, retained in a press or other measures to prevent the deformation being taken.

The strength of the fired body can be further improved by impregnating it with a liquid containing at least one of the components of the above-mentioned matrix composition and firing it again, whereby the voids formed during the first firing are filled. Thus the prepreg of the present invention can be used for articles of reinforced ceramics having various shapes such as heat- or fire-resistive or heat-insulating members of aircraft, space shuttles and heat-resistive or heat-insulating members of jet engines, rocket engines, gas turbine engines, turbine blades, space modules, members of heaters and burners, jigs, tools, or furnace walls, protective tubes for in-furnace instruments, containers used in furnaces, parts of high temperature furnaces, etc.

That is, this invention provides prepreg formed by impregnating tow or fabric of inorganic fibers with a matrix composition or thermally infiltrating the composition into the tow or fabric, said composition comprising:

(A) fine powder of a metal oxide or oxides having an average particle diameter of not larger than 1 μm, (B) a soluble siloxane polymer having double chain structure, (C) a trifunctional silane compound having at least one ethylenically unsaturated double bond in the molecule thereof, (D) an organic peroxide, (E) a radically polymerizable monomer having at least two ethylenically unsaturated double bonds.

In a preferred embodiment of the invention, the matrix composition comprises 350–750 parts by weight of the (A) component, 80–170 parts by weight of the (B) component, 25–125 parts by weight of the (C) component, 1–4 parts by weight of the (D) component, and 25–125 parts by weight of the (E) component.

In a preferred embodiment of the invention, the (A) component is at least one of oxides or multiple oxide comprising oxides of silicon, aluminum or titanium.

In a preferred embodiment of the invention, the (B) component is polysilsesquioxane.

In a preferred embodiment of the invention, the (B) component is at least one selected from a group consisting of polyphenylsilsesquioxane, polyethylsilsesquioxane, polymethylsilsesquioxane and copolymer comprising these monomers.

In a preferred embodiment of the invention, the (C) component is gamma-(meth)acryloxyalkyltrialkoxisilane.

In a preferred embodiment of the invention, the (D) component is a peroxide whose temperature for obtaining a half life of 10 hours is not lower than 110° C.

In a preferred embodiment of the invention, the (E) component is a di(meth)acrylate of a polyhydric alcohol and/or a tri(meth)acrylate of a polyhydric alcohol.

In a preferred embodiment of the invention, the inorganic fibers are at least one kind of oxide inorganic fibers selected from a group consisting of glass fibers, alumina fibers, silica fibers, silicon-titanium oxy carbide fibers (Tyranno Fiber®) and mixed fibers mainly comprising alumina and/or silica.

In a preferred embodiment of the invention, the fibers are in the form of a sheet of unidirectionally aligned tow, a bundle of tow, a woven, a knit or a non-woven sheet.

This invention also provides a process for preparing prepreg comprising dissolving and/or dispersing the components (A), (B), (C), (D) and (E) in a solvent, impregnating a tow, a unidirectionally aligned sheet of tow or a fabric of inorganic fibers with or applying to them the resulting liquid and removing at least part of the solvent.

In a preferred embodiment of the process of invention, part of the solvent is removed from the composition containing the components (A), (B), (C), (D) and (E) to form a sheet of the concentrated composition, which is applied to fiber materials and thermally infiltrated into the fibers.

In a preferred embodiment of the process invention, the operation of impregnation of said sheet is carried out by alternately laying a plurality of said sheets and the sheets of the inorganic fibers one on another and thermally infiltrating the former into the latter.

The present invention also provides cured prepreg articles which are produced by laminating sheets of the prepreg of the present invention and forming the resulting laminate into a form or forming tow of the prepreg of the present invention into a form and heat-treating and pressing the formed body at 120°–250° C. under a pressures of 2–10 kg/cm².

The present invention also provides fired prepreg articles which are formed by heating said cured prepreg articles to 500°–1,200° C.

In the preferred embodiment of the invention of the fired prepreg articles, the cured prepreg is heated to 500°–1,200° C. in air under normal pressure and free standing condition.

In the preferred embodiment of the process for preparing the fired articles, heating is carried out by raising the temperature at a rate of not higher than 5° C./min up to 500° C. and thereafter heating up to a temperature of between 500° C. and 1,200° C.

The present invention also provides a process for densifying fired prepreg articles comprising saturating a fired prepreg article with the above described composition containing the components (A), (B), (C), (D) and (E) or at least the (B) component and heating the article to 500°–1,200° C. at least once.

Now the process from the formation of the prepreg to the curing of the prepreg and the firing of the cured prepreg is described in detail.

Examples of metal oxides of the above-described (A) components are single oxides such as silica, alumina, titanium oxide, lithium oxide, zinc oxide, tin oxide, calcium oxide, magnesium oxide, boron trioxide, zirconia, partially stabilized zirconia, vanadium pentoxide, barium oxide, yttria, ferrite, etc. and multiple oxides such as mullite, steatite, forsterite, cordierite, aluminum titanate, barium titanate, strontium titanate, potassium titanate, lead titanate ziconate, etc. These can be used alone or as a combination of two or more.

Of these metal oxides, at least one of alumina, silica, titanium oxide and multiple oxide comprising these oxides are preferred.

The metal oxide used in the present invention has an average particle diameter of not larger than 1 μm, preferably not larger than 0.5 μm. Such fine powder of the metal oxide is included in the three dimensional network structure constituted with the components (C), (D) and (E) densely packed thereinto and, therefore, easily causes strong mutual bonding. If a metal oxide particles whose average particle diameter is in excess of 1 μm is used, no fired prepreg body having sufficient strength cannot be prepared in accordance with the process of this invention.

The fine powder stored in the atmosphere more or less bears hydroxyl groups on at least a part of the surface thereof, which effectively work for bonding as described later. The fine powders of metal nitride, metal carbide. etc. do not have a sufficient amount of hydroxyl groups and, therefore, they do not sufficiently work for the object of the present invention. Also, if ceramic bodies are to be made of only the fine powder of the above-described metal oxide, sintering at high temperature and under high pressure is required and thus the effect of the invention is not obtained, that is, the object of the present invention is not achieved.

The (B) component soluble siloxane polymer may be a homopolymer or a copolymer, This (B) component works as a binder for the above-described metal oxide.

Generally speaking, the so-called ladder structure organic polymer having double chain structure is considered to have excellent heat resistance and to be rigid with less thermal shrinkage in comparison with linear organic polymers. However, organic polymers, even if they are of the ladder structure, decompose or shrink generating a large amount of gas at temperatures in excess of 500° C. Therefore, even if fired prepreg articles are prepared using a ladder structure organic polymer as a binder, the fired prepreg articles are not free from cracks and voids.

We extensively studied about the binder for fine powder of metal oxide, and found that siloxane polymers or siloxane copolymers having the double chain structure have a higher secondary transition point (glass transition temperature) and exhibit good bonding effect to the metal oxide. Further, we recognized that most part of said polymer or copolymer is converted to a ceramic composition by firing and thus they are the best as a binder for the metal oxide fine powder used in the present invention. What is called "soluble siloxane polymer having double chain structure" includes oligomers.

The raw materials for preparing siloxane polymer having double chain structure include trialkoxysilane represented by the chemical formula R'Si(OR)$_3$, wherein R stands for an alkyl such as methyl, ethyl, etc. and R' stands for an aliphatic, alicyclic or aromatic substituent such as alkyl, phenyl, vinyl, cyclopentyl, cyclohexyl, methacryloyl, etc.

Examples of this trialkoxysilane are methyltriethoxysilane, methyltrimethoxysilane, propyltrimethoxysilane, methyltriisopropoxysilane, methyltributoxysilane, octyltriethoxysilane, vinyltriethoxysilane, phenyltriethoxysilane, gamma-methacryloxypropyltrimethoxysilane, etc.

The (B) component soluble siloxane polymers can be prepared by hydrolyzing one or more trialkoxysilane in the presence of an acid catalyst and condense it in accordance with a known process such as described in J. F. Brown et al., J. Polymer Sci., Part C No. 1, p.83 (1963) for instance. These compounds are called polysilsesquioxane and represented by the following general formulas.

Homopolymer

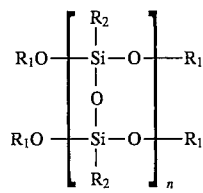

Copolymer

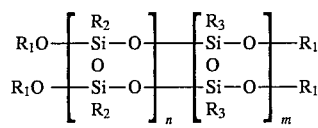

wherein $R_1$ stands for a hydrogen atom or R of the formula R'Si(OR)$_3$ and $R_2$ and $R_3$ stand for R' of the formula R'Si(OR)$_3$.

Examples of polysilsesquioxane are polymethylsilsesquioxane, polyphenylsilsesquioxane, polyvinylmethylsilsesquioxane, polyphenylmethylsilsesquioxane, polyphenylpropylsilsesquioxane, polymethyl-n-hexylsilsesquioxane, polyphenylmethacrylioxypropylsilsesquioxane, polyphenylmethylvinyl-hydrogen-silsesquioxane, etc.

Among these, polyphenylsilsesquioxane, polyphenylmethylsilsesquioxane, polyphenylethylsilsesquioxane are preferred. In the case of copolymer, the molar ratio of the phenyl group and the methyl or ethyl group (phenyl/methyl or ethyl) is preferably 2/1—1/2 since thermal shrinkage is small and manufacturing is easy when the ratio is in this range.

The molecular weight of the above siloxane as a binder is not limited in particular, although it is usually not less than 1,000, preferably not less than 1,500 except the case where the siloxane is used for densification of the fired product.

Polyphenylsilsesquioxane, for instance, is soluble in solvents, the solution can give a tough film. The glass transition temperature Tg thereof is as high as 300°–400° C. and hence the thermal deformation in curing and firing is limited minimum. This polymer does not suffer cleavage of the main chain even when it is heated to 900° C. and is able to be converted to a ceramic structure such as silicon oxy carbide (Si—C—O) in a high yield.

In contrast, when organic polymer binders are used, during the firing under normal pressure, organic polymers decompose and bonding between the metal oxide particles is lost and cracking occurs.

As is apparent from the above description, in the present invention, soluble siloxane polymers having double chain structure are used, and the formed prepreg body does not suffer remarkable shrinkage even when heated to high temperatures and converted to ceramics per se. Thus use of soluble siloxane polymer having double chain structure is especially advantageous in the firing under normal pressure in the free standing condition. The term "normal pressure" includes the condition in which intentional pressurization or depressurization is not applied.

Among the above-described soluble siloxane polymers having double chain structure, especially advantageous are those having silanol groups or alokoxy groups at the chain ends. The soluble siloxane polymer having terminal silanol groups or alkoxy groups has affinity to fine powder of the (A) component metal oxide which have hydroxy groups at least in a part of the surface and the polymer and the powder are well mutually dispersed and react each other by firing to form a ceramic material. Therefore, the so-called silicones such as polymers of dimethyldichlorosilane, which are stable, are not included in the present invention.

Even the most thermally stable soluble siloxane polymer having double chain structure exhibits shrinkage up to about 10% when heated to about 1000° C. and may develop dimensional change in firing causing cracking and formation of voids. Therefore, it is not sufficient to use the above-described (B) component only.

We found that it is effective to form a strong three dimensional network structure beforehand in the cured prepreg body in order to prevent deformation of the cured prepreg body when it is fired at 1,200° C. even if under normal pressure and free standing condition.

For this purpose, it is necessary to use the (C) component which is a trifunctional silane compound having at least one ethylenically unsaturated double bond in its molecule; the (D) component which is an organic peroxide; and the (E) component which is a radical-polymerizable monomer having at least two ethylenically unsaturated double bonds in the molecule thereof.

As has been explained with respect to the prior art, combined crosslinking systems for rubbers or polymers comprising a crosslinking agent (peroxide) and co-crosslinking agent (reactive monomer) are known. However, the combination of ethylenenically unsaturated trifunctional silane compound having at least one ethylenically unsaturated double bond in the molecule thereof (component (C)), an organic peroxide (component (D)) and a radical-polymerizable monomer having at least two ethylenically unsaturated double bonds in the molecule thereof (component (E)) has not yet been known.

The silane coupling agent is an agent having a functional group such as methoxy group, etc., which chemically combines with inorganic substances, and another functional group such as vinyl and amino groups, etc., which chemically combine with organic substances, and is widely used for enhancing bonding of inorganic substances and organic substances such as resin and thus improves strength of composite materials. The silane coupling agent is usually used by applying it to the surface of an inorganic material or mixing it in a resin or by combined employment of these two procedures.

In the present invention, it is necessary to enhance the affinity of the (A) component and (B) component, which are a ceramics or a ceramic precursor, and the (E) component which is an organic material, and thus to facilitate formation of the strong three-dimensional network structure in the matrix and strengthen the bonding between the matrix material and the inorganic fibers.

In order to achieve the above purpose, it is not that all of the known silane coupling agents can be used. In the present invention, as the (C) component, trifunctional silane compounds having at least one ethylenically unsaturated double bond in the molecule thereof is used. This (C) component compound easily reacts with the end of molecule of the soluble siloxane polymer having double chain structure of the (B) component and fine particles of the metal oxide. These bonds are effected by dehydration condensation of hydroxy groups. As the trifunctional silane compound of the (C) component also easily reacts with the hydroxy groups on the surface of the inorganic fibers, bonding between the matrix composition and the inorganic fibers is strengthened. Therefore, oxide fibers are preferred to inorganic fibers of nitride, carbide, etc. The ethylenically unsaturated double bond of the (C) component reacts with the radical catalyst of the (D) component and incorporated into the network structure.

Examples of the trifunctional silane compound having at least one ethylenically unsaturated double bond are vinyl-tris-(beta-methoxyethoxy)silane, vinyl-trimethoxysilane, vinyl-triethoxysilane, gamma-methacryloxypropyltrimethoxysilane, gamma-methacryloxypropyltriethoxysilane, etc. Among these, gamma-methacryloxyalkyltrialkoxysilane is preferred and especially gamma-methacryloxypropyltrimethoxysilane and gamma-methacryloxypropylethoxysilane are preferred.

In order to form the network structure in the cured body, a crosslinking agent is required. In the present invention, an organic peroxide (the (D) component) is effective as a crossling agent.

In the present invention, for organic peroxide to function effectively, the organic peroxides such that decompose to produce radicals prior to curing is not desirable. Organic peroxide, whose half life is 10 hours at temperatures of 110° C. or higher, are preferred.

Examples of such organic peroxide are dicumyl peroxide, t-butylcumyl peroxide, di-t-butyl peroxide, α, α-bis-(t-butylperoxyisopropyl)benzene, di-t-butylperoxydiisopropylbenzene, 2,5-dimethyl-2,5-di(t-butyl-peroxy)hexyne- 3, 1,1-bis(t-butylperoxy)-3,3,5-trimethylcyclohexane, 2,2-bis(t-butylperoxy)butane, 2,2-bis-(t-butylperoxy)octane, etc.

The matrix composition in the present invention, in addition to the above-described peroxide which is a crossling agent of the (D) component, contains a radical-polymerizable monomer having at least two, preferably three ethylenically unsaturated double bonds as the (E) component. This (E) component contributes to formation of the strong three dimensional network structure in curing as a co-crosslinking agnet. The matrix composition containing the (E) component contains fine powder of metal oxide and is converted to undeformable and effective network structure having sufficient chain length by heat treatment.

Examples of the (E) component are ethyleneglycol di(meth)acrylate, triethyleneglycol di(meth)acrylate, ethyleneglycol diitaconate, tetramethyleneglycol diitaconate, ethyleneglycol dicrotonate, ethyleneglycol dimaleate, trimethylolpropane tri(meth)acrylate, trimethylolethane tri(meth)acrylate, pentaerythritol tetra(meth)acrylate, etc. In the above description "(meth)acrylate" means "acrylate, methacrylate or both".

Among these, di(meth)acrylate of polyhydric alcohol and/or tri(meth)acrylate of polyhydric alcohol such as trimethylolpropane tri(meth)acrylate is preferred, since it excellent in radical polymerization, provides effective chain length and gives excellent tack property to the prepreg.

The above described materials which constitute the matrix compositon are dissolved or dispersed in an organic solvent.

The solvent is suitably selected in accordance with the species and mixing ratio of the components. Examples of the solvents suitably used in the present invention are alcohols, aromatic hydrocarbons, alkanes, ketones, nitriles, esters, glycol esters, etc. including N-vinylpyrrolidone. The solvent is peferably completely removed prior to curing and, therefore, low-boiling solvents such as acetone are preferred although it is not specifically limited thereto. The solvent can be used alone or in combination of two or more.

In the present invention, it is preferred that the components (A) to (E) are dissolved or dispersed in a solvent as uniformly as possible in order to give a dense structure in the ceramic matrix after firing. For that purpose, it is all right if each of the components (B), (C), (D) and (E) is dissolved in a solvent under stirring and the (A) component is added to the resulting solution (which should have a viscosity as low as 10 cps without the (A) component) or dispersion and the mixture is well stirred until all the components are well mixed or if all the (A) to (E) components are simultaneously added to a solvent and sufficiently stirred. Either way achieves the purpose of the present invention. It is possible to add a slight amount of a dispersion stabilizer such as a surfactant conventionally used. Further, other additives can be added insofar as the properties of the resulting matrix composition are not impaired.

The content ratio of the components of the matrix composition is suitably selected depending on the species of the components and the properties of cured prepreg, fired prepreg to be formed with the matrix composition and other components. In many cases, the matrix composition contains the components in the following content ratio.

The content of the (A) component is 350–750 parts by weight, preferably 450–650 parts by weight; the content of the (B) component is 80–170 parts by weight, preferably 100–150 parts by weight; the content of the (C) component is 25–125 parts by weight, preferably 50–100 parts by weight, and more preferably 30–80 parts by weight; the content of the (D) component is 1–4 parts by weight, preferably 1.5–3 parts by weight; and the content of the (E) component is 25–125 parts by weight, preferably 25–100 parts by weight, more preferably 25–50 parts by weight.

Tack property of the prepreg is adjusted by the amount of the (E) component with the effect of the other components being considered. Therefore, the (E) component not only forms the network structure but also plays an important role of providing tack.

The matrix composition can be used as containing the solvent or can be used in the form of a sheet by removing the solvent.

The prepreg of the present invention is prepared by impregnating tow or fabric of inorganic fibers with the above-described matrix composition or thermally infiltrating said composition in the tow or fabric.

The inorganic fibers to be used should preferably retain the strength sufficient for practical use at the temperature up to 500° C., preferably 1,000° C. and more preferably up to 1,200° C. The inorganic fibers which satisfy this requirement are inorganic fibers such as nitride fibers, carbide fibers, oxide fibers, etc. and carbon fibers. These inorganic fibers have sufficient heat resistance and reinforcing effect as required in the present invention.

Preferred inorganic fibers are, for instance, glass fibers, alumina fibers, silica fibers, titanium-silicon oxy carbide fibers (Tyranno Fibers®, manufactured by Ube Industries, Ltd.) as well as various fibers mainly comprising alumina and/or silica. Although glass fibers lose strength at high temperatures, they have higher strength at room temperature than other inorganic fibers and they retain practically sufficient strength temperatures of up to 600° C.

When commercially available inorganic fibers are used, the sizing agent which is applied to the fibers should preferably be removed prior to use.

Characteristics of fiber-reinforced ceramics reside in that the fracture process is controlled by the friction between the fibers and the matrix and that the fibers bear the load. Different from fiber-reinforced plastics and fiber-reinforced metallic materials, it is considered important that the interface bonding between the fibers and the matrix is not excessively strong but properly controlled to the extent that pull-out of fibers is not prevented. (Refer to Koichi Niihara, NIKKEI MECHANICAL, 1989, 12, 11 P. 114.) This means that sufficient bonding of the fibers and the matrix is desired in the cured prepreg but rather weak bonding is desirable in the fired prepreg.

As coating agents for fiber surface which form such interfacial bonding, carbon and boron nitride are known. In air, carbon is oxidized at about 450° C. or higher temperatures and boron nitride is oxidized at about 900° C. or higher temperatures, and, therefore, it is regarded that they give rather loose interfacial bonding between fibers and matrix. It is effective for improving the mechanical properties such as fracture toughness of the fired prepreg articles to apply the known surface coating to the fibers used in the present invention beforehand.

The inorganic fibers are used in the form of bundles of tow, sheet of unidirectionally aligned tow or sheets of fabric, that is, knit, woven or non-woven sheets.

The prepreg of the present invention can be prepared by processes similar to those employed in the preparation of the conventional epoxy resin prepreg, that is, solvent process (wet process), hot melt process (dry process), etc.

By a process similar to the solvent process, prepreg can be prepared by soaking a bundle of tow, sheet of unidirectionally aligned tow or a sheet of fabric of fibers in a matrix composition liquid, squeezing the tow or the fabric to remove excessive liquid and removing the solvent by blowing hot air or passing them through a drying apparatus.

Also prepreg can be obtained by the hot melt process. That is, sheets (this term encompasses film) of the matrix composition having a predetermined weight are prepared from the matrix composition liquid by removing the solvent, the sheet or sheets are placed on one surface or on both surfaces of a bundle of tow, a sheet of unidirectionally aligned tow or a sheet of fabric of the inorganic fibers or the sheets of the matrix composition and the sheet of fibers are alternately placed on each other and usually heated to a temperature not exceeding 120° C., whereby the viscosity of the sheet of the matrix composition is reduced and the composition permeates the fibers, and thus prepreg is obtained.

The thus obtained prepreg has sufficient tack and drape as well as out-time to form laminates.

The thus prepared prepreg is formed into a predetermined shape by means of the known lamination or filament winding process and heated under pressure, that is, cured. The specific feature of the present invention is that the prepreg is sufficiently cured (hardened) by one step curing and does not require two step curing (including pre-curing) or three step curing (including pre-curing and post-curing). However, pre-curing and post-curing can be employed if it desirable.

Preferred conditions of curing are 120°–250° C. in temperature, 2–10 kg/cm$^2$ in pressure and 10–60 min in curing time.

Curing is effected by evacuating the prepreg in a bag and thereafter heating and pressing in an autoclave or using a hot press.

With an autoclave, preparation of large articles of complicated configuration is possible and, therefore, employment of the same is advantageous for commercial scale production.

The obtained cured prepreg articles are free from shrinkage and surface cracks with no weight loss suffered. Specifically, the cured body has a flexural strength of 25–50 kg/mm$^2$ and hardly suffers shrinkage even if it is heated to 1,000° C. in air under normal pressure.

The reason why the thus obtained cured prepreg body hardly suffer shrinkage is thought to be that the fine particles of the metal oxide are densely packed and retained with tight contact in the strong three dimensional network structure formed by curing and the inorganic fibers and the matrix are well bonded and does not undergo cleavage and separation.

The obtained cured prepreg body can be converted to a fired prepreg body by heating to 500°–1,200° C., preferably 600°–1,000° C., more preferably 600°–800° C. The cured prepreg can be heated to a temperature in excess of 1,200° C. but it is sometimes not desirable since excessively high temperatures may cause drop of the strength of the inorganic fibers. It is effective for prevention of occurrence of deformation and cracking to control the rate of temperature rise at 5° C./min or less, preferably 2° C./min or less up to 500° C., especially between 100° C. and 450° C. Under such heating conditions, the cured prepreg body can be heated under normal pressure and free standing condition. The cured prepreg body thus heated to a predetermined temperature is preferably kept at the temperature for at least 10 minutes. Thereafter it is cooled by the conventional procedure.

Heating can be carried out either in an oxidation atmosphere, that is, in air, or in an inert gas atmosphere. However, a fired prepreg body heated in an inert gas atmosphere appears black because of the carbon which remains in the matrix without being thermally decomposed and removed. The fired body turns white releasing the carbon if it is re-fired in air. Therefore, if the fired prepreg body is used in air at a high temperature, the remaining carbon is oxidized and released from the fired body as gas. There is a tendency that the fired prepreg body prepared in an inert gas atmosphere is inferior to that prepared in air in strength. Judging from this fact, it cannot always be said that the firing in an inert gas atmosphere is more advantageous than firing in air in process steps and performance of the product.

One of the important features of the present invention is the fact that firing can be carried out in air under normal pressure and free standing condition without occurrence of deformation. Thus the invention enables manufacturing of ceramic products of a large size and complicated configuration.

In order to achieve this effect, all the components (A), (B), (C), (D) and (E) are essential as components of the matrix composition. Even if one of these component lacks, the object of the present invention is not achieved. The fired prepreg article prepared in accordance with the present invention can satisfactorily be used as is. However, if it is subjected to densifying treatment as specifically described below, the performance thereof is further improved.

The cured prepreg body contains 10–15% of organic substances according to the mixing ratio of the components. A portion of them is incorporated in the resulting ceramic composition and the remaining portion is released as gases during the firing. This causes formation of microvoids in the fired body. These voids can be filled up by saturating the fired body with a liquid containing the (A) to (E) components of the matrix composition or a liquid containing at least the (B) component and re-fire it at a temperature of 500°– 1,200° C. or preferably 600°–1,200° C. This densifying treatment can be repeated.

The fired prepreg articles of the present invention can be suitably used as heat-resistive structural members, heat-insulating members for aircraft and space shuttles; heat-resistive members and heat-insulating members for jet engines, rocket engines, gas turbine engines; turbine blades, parts of space modules, members of heaters and burners, fabrication jigs, tools, members for high temperature furnaces (furnace wall, core tubes, protective tubes for measurement devices, in-furnace vessels, etc.), etc.

EMBODIMENT OF THE INVENTION

Now the invention is specifically described by way of working examples. Needless to say, however, the invention is not limited to the specific embodiments described below.

EXAMPLE 1

Preparation of Matrix Composition I

In a ball mill containing ceramic balls, 400 parts by weight of alumina powder (average particle diameter: 0.4 μm), 200 parts by weight of titanium oxide (average particle diameter: 0.4 μm), 125 parts by weight of polyphenylmethylsilsesquioxane (MW: 2,300, phenyl/methyl ratio: 6/4), 40 parts by weight of gamma-methacryloxypropylmethoxysilane, 25 parts by weight of trimethylolpropane trimethacrylate, 2 parts by weight of 2,5-dimethyl- 2,5-di(t-butylperoxy)-hexyne-3, and 250 parts by weight of acetone were placed. By rotating the ball mill for one hour, a liquid matrix composition I, in which the above components were dissolved and uniformly dispersed, was obtained. This liquid composition had a vicosity of 370 cps when measured using Viscotester VT-04 (Rion Co., Ltd.)

EXAMPLE 2

Preparation of Matrix Composition II

In a glass-made cylindrical vessel equipped with a stirrer, 125 parts by weight of polyphenylethylsilsesquioxane (MW: 1,700, phenyl/ethyl ratio=5/5), 100 parts by weight of gamma-methacryloxypropyltriethoxysilane, 30 parts by weight of trimethylolpropane triacrylate, 1.3 parts by weight of dicumylperoxide and 250 parts by weight of acetone were placed. The mixture was stirred until a homogeneous solution was obtained. This solution had a viscosity of 2.95 cps when measured using Vismetron VDA-K (Shibaura Systems, Ltd.) To this solution, 300 parts by weight of alumina powder (average particle diameter: 0.4 μm) and 200 parts by weight of silica powder (average particle diameter: 0.02 μm) were added and dispersed well by applying ultrasonic vibration. Thus matrix composition II was obtained. This composition had a viscosity of 330 cps when viscosity was measured in the same manner as in Example 1.

EXAMPLE 3

Preparation of Matrix Composition III

The matrix composition I obtained in Example 1 was slowly stirred to evaporate off acetone untill the viscosity of the composition became 300 poise. A concentrated matrix composition III, which had good film-forming ability, was obtained.

EXAMPLE 4

Preparation of Prepreg I

In the matrix composition I prepared in Example 1, a woven fabric of alumina fibers ("Altex cloth SV-600- 8H" marketed by Sumitomo Chemical Industries, Ltd. (alumina 85%, silica 25%)) was soaked. After the excessive matrix liquid was removed by squeeze-rolling the fabric, it was placed in an air circulation dryer of 80° C. for 5 minutes to remove the acetone. Thus a sheet of prepreg reinforced with inorganic fibers containing 60 wt % of the matrix composition was obtained.

Tack, drape and out-time were evaluated by a method similar to the conventional method used for the test of epoxy resin prepreg. The results are shown in Table 1.

TABLE 1

| Property | Method of Evaluation | Result |
| --- | --- | --- |
| Tack | A prepreg sheet 250 mm in length, 50 mm in width was wound on a aluminum rod 50 mm in diameter. Whether it peeled off or not after a predetermined time was observed. When it did not peel off after 4 hours, it was judged as "passed". | Passed |
| Drape | A prepreg sheet of 75 mm in length and 50 mm in width was firmly wound on a stainless steel rod 3 mm in diameter. Whether breaking of fibers occurs or not was observed. If no breaking was observed, it was judged as "passed". | Passed |
| Out-time | Prepreg was allowed to stand at room temperature for 3 weeks and whether the prepreg retained the above tack and drape properties was observed. If the prepreg retained the properties, it was judged as "passed". | Passed |

EXAMPLE 5

Preparation of Prepreg II

A sheet of film having a thickness of 0.15 mm was made from the matrix composition III prepared in Example 3 by means of a film coater. This film was applied to both surfaces of the same alumina fiber fabric as used in Example 4 and the composite sheet was passed through a hot roll of 120° C. for infiltration. Thus a prepreg sheet whose matrix content was 50% was prepared. The prepreg was evaluated in accordance with the procedure and criteria as described above in Example 4 and it was recognized that it had tack, drape and out-time of the "passed" degree.

EXAMPLE 6

Preparation of Prepreg III

A tow of alumina fibers ("Altex SV-10- 1K" manufactured by Sumitomo Chemical Industries, Ltd. (alumina 85 wt %, silica 15 wt %)), from which the sizing agent had been removed, was soaked in the liquid matrix composition prepared in Example 1 for impregnation and the impregnated tow was squeezed through a nozzle. The tow was wound on a drum 30 cm in diameter covered by a sheet of release paper wound thereon at a pitch of 1.5 mm by means of a filament winder and thus a cylindrical sheet was formed. The sheet was cut and removed from the drum and dried in an air circulation dryer of 80° C. for 5 minutes to remove acetone. Thus a unidirectional sheet of prepreg whose content of the matrix composition is 50% was obtained. Tack, drape and out-time were evaluated in accordance with the methods described in Example 4 and this prepreg had tack, drape and out-time of the "passed" degree.

EXAMPLE 7

Preparation of Cured Prepreg I

Nine sheets of the prepreg prepared in Example 6 were laminated in the same direction. The resulting laminate was evacuated in a bag, placed in an autoclave, heated to 220° C. at a rate of 2.5 ° C./min, retained at that temperature for 30 min, cooled at a rate of 4.5° C./min and thus a cured prepreg plate having a thickness of 3 mm was obtained. A test piece having a width of 4 mm and a length of 36 mm was cut out of this plate and subjected to the flexure test according to JIS R 1601 and was proved to have a flexural strength of 57.7 kg/mm$^2$.

In the following examples, the same flexure test was carried out. The indicated value is an average of 5 measurements.

EXAMPLE 8

Preparation of Cured Prepreg II

Four sheets of the prepreg prepared in Example 4 were laminated alternately in the right angle and the laminate was hot-pressed at 200° C. under a pressure of 3.5 kg/cm$^2$ for 15 min. Thus a cured prepreg plate having a thickness of 2 mm was obtained. The cured prepreg plate had good mechanical strength and no shrinkage and cracking were observed. The weight loss was 0.7%. The flexural strength of this cured prepreg was 28.0 kg/mm$^2$ when measured in the same manner as in Example 7.

EXAMPLE 9

Preparation of Cured Prepreg III

Four sheets of the prepreg prepared in Example 5 was laminated alternately in the right angle and the laminate was hot-pressed at 150° C. under a pressure of 3.5 kg/cm$^2$ for 15 min. Thus a cured prepreg plate having a thickness of 2 mm was obtained. The cured prepreg plate had good mechanical strength and no shrinkage and cracks were observed. The weight loss was 0.6%. The flexural strength of this cured prepreg was 32.3 kg/mm$^2$ when measured in the same manner as in Example 7.

EXAMPLE 10

Firing of Cured Prepreg I

The cured prepreg plate prepared in Example 7 was heated to 500° C. in air under normal pressure at a temperature rise rate of 1° C./min, then heated to 1,000 ° C. at a rate of 2° C./min and retained at that temperature for 1 hour. Thus a ceramic laminate reinforced with alumina fiber (fired prepreg) was obtained.

There was almost no dimensional change observed between the cured prepreg plate and the fired prepreg. There was a weight loss of 7.3% in comparison with the non-fired cured prepreg.

HIGH TEMPERATURE STRENGTH TEST

The above obtained fired laminated prepreg was subjected to a high temperature flexure test at 800° C. and 1,000° C. in accordance with JIS R 1604 with slight modification. The results are shown in Table 2. As seen there, a tendency was recognized that as temperature rose the strength increased. It is surmised that as the temperature rose, the bond between the fibers and the matrix was loosened and the pull-out effect of the fibers was enhanced and/or the elongation of the matrix increased, which induced the increase in strength.

TABLE 2

| Test Temp. (°C.) | Room Temp. | 800° C. | 1,000° C. |
| --- | --- | --- | --- |
| Flex'al Strength (kg/mm$^2$) | 28.3 | 31.6 | 33.2 |

HEAT CYCLE TEST

The above described fired laminated prepreg was subjected to heat cycle tests between room temperature and 1,000° C. of 5 times, 10 times, 15 times and 20 times and the flexural strength was measured. The results are shown in Table 3. No strength drop was recognized in the heat cycle test between room temperature and 1,000° C.

TABLE 3

| Cycle | 0 | 5 | 10 | 15 | 20 |
|---|---|---|---|---|---|
| Flex'al Strength (Kg/mm$^2$) | 28.3 | 27.8 | 27.2 | 27.5 | 27.2 |

EXAMPLE 11

Firing of Cured Prepreg II

The cured prepreg plate prepared in Example 9 was heated to 800° C. in air and under normal pressure at a temperature rise rate of 1.5° C./min and retained at that temperature for 1 hour. Thus a ceramic laminate reinforced with alumina fibers (fired prepreg) was prepared. The shrinkage between the cured prepreg and the fired prepreg was 0.03% in the longitudinal direction and 0.8% in the direction of thickness.

The high temperature strength test and heat cycle test were carried out and the results are shown in Table 4 and Table 5. There was the same tendency as shown in Table 2 and Table 3.

TABLE 4

| Test Temp. (°C.) | Room Temp. | 800° C. | 1,000° C. |
|---|---|---|---|
| Flex'al Strength (kg/mm$^2$) | 14.0 | 15.8 | 17.1 |

TABLE 5

| Cycle | 0 | 5 | 10 | 15 | 20 |
|---|---|---|---|---|---|
| Flex'al Strength (Kg/mm$^2$) | 14.0 | 13.2 | 13.7 | 15.1 | 14.7 |

EXAMPLE 12

Densifying Treatment I

In a glass-made cylindrical vessel equipped with a stirrer, 125 parts by weight of polyphenylmethylsilsesquioxane (MW: 1,700, phenyl/methyl ratio=5/5), 100 parts by weight of gamma-methacryloxypropylmethoxysilane, 1.3 parts by weight of dicumylperoxide, and 250 parts by weight of acetone were placed and the mixture was stirred until a homogeneous solution was obtained.

In this solution in the glass-made cylindrical vessel, the laminated ceramic plate reinforced with vessel, the laminated ceramic plate reinforced with alumina fibers (fired prepreg plate) obtained in Example 11 was soaked and the vessel was retained under reduced pressure until bubbles were no longer generated. The evacuation was discontinued and the laminated plate was taken out. The solution attached on the surface was removed and the laminated ceramic plate was placed in a dryer of 80° C. to evaporate off the acetone. Then the laminated ceramic plate was placed in an electric furnace and heated to 800° C. in air at a temperature rise rate of 1° C./min and it was kept at the temperature for 1 hour.

A densified plate was obtained. This specimen was designated "once-impregnated sample". The same procedure was repeated twice and three times and the specimen were designated "twice-impregnated sample" and "thrice impregnated sample". The results of flexure strength test of the these samples are indicated in Table 6.

TABLE 6

| | Before Impreg'n | 1st | 2nd | 3rd |
|---|---|---|---|---|
| Flex'al Strength (Kg/mm$^2$) | 14.0 | 20.9 | 23.9 | 24.8 |

EXAMPLE 13

Densifying Treatment II

The alumina-fiber-reinforced laminated ceramic plate prepared in Example 11 was placed in a vacuum vessel and the vessel was evacuated. Methylphenylvinyl-hydrogen-polysiloxane (H62C, manufactured by Wacker-Chemie GmbH), which hade been preheated to 80° C. was introduced into the vessel and the vessel was allowed to stand overnight. The vessel was opened and the laminated plate was taken out and the solution remaining on the surface was removed. Then the laminated ceramic plate was heated in an electric furnace in air to 800° C. at a temperature rise rate of 1.5° C./min and properties thereof before and after the densification were shown in Table 11 concerning Example 11.

EXAMPLE 14

Densifying Treatment III

The ceramic laminated plate reinforced with alumina fibers prepared in Example 10 was placed in a vacuum vessel and a densified laminated ceramic plate was prepared in the same manner as in Example 13.

This sample was designated "once impregnated sample", densification was repeated and the product was designated "twice impregnated sample". The test results are shown in Table 7.

TABLE 7

| | Before Impreg'n | 1st | 2nd |
|---|---|---|---|
| Flex'al Strength (Kg/mm$^2$) | 28.3 | 35.9 | 38.1 |

EXAMPLE 15

Glass-fiber-Reinforced Sample

In a ball mill containing ceramic balls, 400 parts by weight of alumina powder (average particle diameter: 0.4 μm), 200 parts by weight of titanium oxide powder (average particle diameter: 0.4 μm), 125 parts by weight of polyphenylsilsesquioxane, 50 parts by weight of gamma-methacryloxypropyltrimethoxysilane, 2 parts by weight of dicumylperoxide and 250 parts by weight of methanol were placed and milled for 1 hour. Thus a uniformly dissolved and dispersed matrix composition liquid was obtained.

A sheet of woven glass fiber cloth ("6781HT-38" manufactured by Hexcel, Inc.) was soaked in this liquid and surplus liquid was removed by means of a squeeze roll and the cloth was dried in an air circulation dryer of 80° C. Thus a prepreg whose matrix composition content was 65 wt % was obtained.

This prepreg was evaluated by the method described in Example 4 and exhibited tack, drape and out-time of the "passed" degree.

Eight sheets of this prepreg were laminated alternately in the right angle one on another. The resulting laminate was evacuated in a bag in the conventional manner. Thereafter, the laminate was placed in an autoclave, heated up to 150° C. under a pressure of 5 kg/cm² at a temperature rise rate of 2.5 ° C./min and retained at that temperature for 15 minutes. Thereafter, the laminate was cooled at a rate of 4.5 ° C./min and thus a cured prepreg plate having a thickness of 3 mm.

No shrinkage and surface cracks were observed in the obtained cured prepreg plate and the weight loss was 1.1%.

This cured prepreg plate was heated to 400° C., 500 ° C., 600° C. and 700° C. in air under normal pressure at a temperature rise rate of 1.5° C./min and retained at each temperature for 1 hour.

The weight loss was measured using a thermal analysis apparatus "TG/DTA30" manufactured by Seiko Electronic Industries, Ltd. under air stream at a temperature rise rate of 1.5° C./min. Temperature rise tests up to 400° C., 500° C., 600° C. and 800° C. were carried out. The weight loss and flexural strength of fired prepreg laminate were shown in Table 8. Weight loss is indicated on the basis of the weight of the cured laminated body.

TABLE 8

| Temp. (°C.) | Wt. Loss (%) | Flex'al Strength (kg/mm²) | Color of Baked Sample |
|---|---|---|---|
| 400 | 3.7 | 13.7 | light brown |
| 500 | 6.3 | 12.7 | light brown (lighter than 400° C.) |
| 600 | 7.2 | 10.2 | white |
| 700 | — | 10.4 | white |
| 800 | 7.3 | — | white |

Weight loss is larger as the samples are heated to higher temperatures but it reached constant at 600° C. As to the color, the sample which was heat-treated at 500° C. for 1 hour was still colored but samples heated to 600° C. or higher temperatures were white.

These results suggest that organic components and their decomposition products remain at temperatures not higher than 500° C. but they are completely released and the fired prepreg turns to ceramics at temperatures higher than 600° C. The flexural strength of the product fired at 600° C. or higher temperatures is lower than that of that fired at 500° or lower temperatures. It is thought that this is because release of organic components caused development of defects in the fired body. Heat treatment for more than 10 minutes at 600° C. suffices for releasing of the organic components and conversion of the pre-ceramic components to ceramics. The results teach that even if prolonged heat treatment at lower temperatures is employed, firing temperature of at least 500° C. is required.

In comparison with ceramic fibers such as alumina fibers, glass fibers are remarkable in fall of the strength at higher temperatures. However, their strength at room temperature is markedly higher than that of ceramic fibers and retain feasible strength (tensile strength of around 200 kg/mm² for instance) even at 600° C. S-Glass Fiber manufactured by Owens Corning Fiber Glass Company, T-Glass Fiber marketed by Nitto Boseki K. K. are examples of such glass fibers. Therefore, the fact that the pre-ceramic components (B) and (C) in the present invention can be converted to ceramics by heat treatment of short time at 600° C. means that glass fibers, which are inferior to ceramic fibers in heat resistance but inexpensive, can be used as reinforcing fibers.

EXAMPLE 16

Influence of Atmosphere in Firing

Four sheets of the prepreg prepared in Example 4 were placed alternately in the right angle one on another and hot-pressed under the conditions of Example 9 and thus cured laminated plate 160 mm in length, 160 mm in width and 2 mm in thickness was prepared. The plate was separated into two. One piece was heated to 800° C. in air at a temperature rise rate of 1°/C./min and retained at that temperature for 1 hour. The other piece was fired in nitrogen under the same conditions. The two samples were subjected to densifying treatment once in the same manner as in Example 13.

Weight change (on the basis of the weight of cured body) in firing and densification and the results of flexure test of densified sample are shown in Table 9

TABLE 9

| Atmosphere | Air | Nitrogen |
|---|---|---|
| Color of fired body | White to interior | Black to interior |
| Weight change | | |
| After fired | 93.8 | 95.5 |
| After densified | 96.6 | 98.1 |
| Mechanical Prop'ties | | |
| Flex'al Strength (kg/mm²) | 21.5 | 18.3 |
| Flex'al Modulus of Elast'y (kg/mm²) | 6740 | 8090 |

The reason why the weight change is smaller in the firing in nitrogen is that the contained organic substances were charred to carbon. The product of firing in nitrogen which appeared black turned white as the product fired in air when it was further fired in air at 800° C. for 1 hour.

The results show that the product fired in nitrogen has inferior strength and higher modulus of elasticity in comparison with the product fired in air. This means that elongation in the firing in air is greater than in the firing in nitrogen, that is, the former gives tougher products.

EXAMPLE 17 AND COMPARATIVE EXAMPLES 1–3

Influence of Matrix Composition I

Four matrix compositions were prepared using materials indicated in Table 10 in the indicated amounts in accordance with the procedures described in Example 1. Preparation of prepregs and cured prepreg bodies (laminates) were carried out as described in Example 4 and Example 8. In Example 17 and Comparative Example 1 indicated in Table 10, cured prepreg laminates were heated to 800° C. at a rate of 1.5° C./min and retained at that temperature for 1 hour and thus fired laminates were obtained.

TABLE 10

| Component | Substances | Ex. 17 | Comp. Ex. 1 | Comp. Ex. 2 | Comp. Ex. 3 |
|---|---|---|---|---|---|
| (A) | Alumina powder | 400 | 400 | 400 | 0 |
|  | $TiO_2$ powder | 200 | 200 | 200 | 0 |
| (B) | Polyphenylethyl-silsesquioxane | 125 | 125 | 125 | 180 |
| (C) | γ-Methacryloxy-propylmethoxy-silane | 40 | 40 | 0 | 0 |
| (D) | 2,5-dimethyl-2,5-di(tributyl-peroxy-hexyne-3 | 2 | 2 | 0 | 0 |
| (E) | Trimethylolpropane triacrylate | 25 | 0 | 0 | 0 |
| Solvent (parts by weight) | Acetone | 250 | 200 | 200 | 200 |

The products were tested and evaluated in the same manner as above and the results are shown in Table 11.

TABLE 11

|  |  | Ex. 17 | | | Comp. Ex. 1 | | |
|---|---|---|---|---|---|---|---|
|  |  | Cured | Fired | Densified | Cured | Fired | Densified |
| Shrinkage (%) | Thickness direct'n | — | 0.69 | — | — | 0.09 | — |
|  | Longitudinal direct'n | — | 0.02 | — | — | 0.02 | — |
| Flexural Strength ($kg/mm^2$) | | 32.2 | 19.4 | 27.8 | 14.9 | 12.5 | 14.0 |
| Flexural Modulus of Elasticity ($kg/mm^2$) | | 5490 | 5640 | 6500 | 4960 | 4680 | 5410 |
| Vicker's Hardness (HV) | | 59.9 | 82.0 | 196.0 | 43.3 | 75.1 | 160.8 |

Shrinkage of the product of Example 17 is somewhat greater than that of Comparative Example 1. It is considered that the reason is that the (E) component organic substance was released during firing. But shrinkage is very small in both Example 17 and Comparative Example 1 and, therefore, almost no dimensional change by firing occurred in both.

It is in the mechanical properties of the laminated plate that there appeared remarkable difference between the two. In any stage of cured plate, fired plate and densified plate, the product of Example 17 exhibits obviously superior values to Comparative Example 1 in flexural strength, flexural modulus of elasticity and Vicker's hardness. This means that in the product of Example 17, the excellent mechanical properties of the cured plate is maintained through the firing stage and the densification stage. Especially, it is recognized that stength-enhancing effect of densification is higher in Example 17 than Comparative 1. That is, flexural strength increases by 50% in the former while the increaseis no more than 20% in the latter. The reason is surmised to be that in the product of the former, the open pore fraction is greater than the closed pore fraction, while in the latter, the closed pore fraction is greater than the open pore fraction.

The above described results mean that when a cured prepreg article of complicated configuration is prepared in accordance with the procedures of Example 17, the formed prepreg materials have good tack, are easy to handle, are and strong and hard, do not suffer deformation and dimensional change even if fired under the free standing condition, whereby occurrence of cracking, which are caused by shrinkage during firing, is controlled minimum, and, as the result, are able to produce ceramic products reinforced with continuous fibers having good mechanical properties. That is to say, the addition of the (E) component provides the laminated product of each stage with excellent mechanical properties, and not only facilitate improvement of strength by densification but gives the prepreg good tack and drape and thus improves shapability and, as a result, provides the product with good mechanical properties.

COMPARATIVE EXAMPLE 4

Infuence of Matrix Composition II

In accordance with the procedures of Example 17. prepreg, cured prepreg bodies and fired prepreg bodies were prepared excepting that mullite ($3Al_2O_3 \cdot 2SiO_2$) was used in stead of alumina and titanium oxide as the (A) component. The mixing ratio of mullite was the same as that of the combined alumina and titanium oxide. Mullite having an average particle diameter of 1.2 μm (this is outside of the particle size range defined in the present invention). Mixing ratios of other components were the same as those in Example 17.

When the matrix composition of Example 17 was used and the laminated prepreg plate was hot-pressed, the thickness of the product was 1.8 mm. In contrast, when mullite was used as the (A) component and the prepreg was hot-pressed under the same conditions, flow of the matrix did not occur and the thickness was 3.1 mm. It was tried to cut out test pieces from the fired laminated plate, but almost all test pieces were broken and even the test pieces which were fortunately cut out showed a flexural stength of as low as 1.1 $kg/mm^2$ and a flexural modulus of elasticity of as low as 1370 $kg/mm^2$. The reason is attributed to a large diameter of oxide particles rather than the oxide composition. This example teaches that metal oxide particles having an average particle diameter of not larger than 1 μm, preferably not larger than 0.5 μm should be used.

EXAMPLE 18

Influence of Matrix Composition III

In accordance with the procedures of Example 17. prepreg, cured prepreg body and fired prepreg body were prepared excepting that the same amount of ethylene glycol dimethacrylate instead of trimethylolpropane trimethacrylate as the (E) component.

The flxural strength of the fired laminated plate was 20.2 $kg/mm^2$ and the flexural modulus of elasticity was 5980 $kg/mm^2$. These values are on the same level as those obtained in Example 17 and indicate that ethylene-glycol dimethacrylate is usable. However, it is recognized that tack is slightly inferior although there is no problem in practical use.

COMPARATIVE EXAMPLE 5 AND 6

Comparison with Polymer Binder

In the conventional slurry process, polymer binders are widely used. So, using polyurethane as a polymer binder, effect of the combination of it and the (D) component and the (E) component was examined (Comparative Example 5). Also using a (C) compnent instead of a polymer, effect of the combination of it and the (D) component and (E) component was examined. 162 Matrix compositions were prepared by the process described in Example 1. The mixing ratio of the matrix compositions are shown in Table 12.

TABLE 12

| Component | Substance | Comp. Ex. 5 | Comp. Ex. 6 |
|---|---|---|---|
| (A) | Alumina powder | 600 | 600 |
| (B) | Polyurethane | 30 | — |
| (C) | γ-Methacryloxy-propylmethoxysilane | — | 30 |
| (D) | Dicumylperoxide | 2 | 2 |
| (E) | Trimethylolpropane triacrylate | 40 | 40 |
| Solvent (parts by weight) | Acetone | 400 | 250 |

Prepreg sheets were prepared using a cloth of alumina fibers used in Example 4 in accordance with the process described in Example 4. The content of the solid matrix component was 60 wt %. Four sheets of this prepreg were laid alternately in the right angle one on another and hot-pressed with a pressure of 3.5 kg/cm$^2$ at 150° C. for 15 minutes so as to shape and cure. Thereafter, the laminated plate was heated in air to 800° C. at a rate of 1.5° C./min and kept at that temperature for 1 hour.

When the matrix composition of Comparative Example 5 was used, no flow of matrix was observed but the prepreg exhibited some tack and was shapable. However, the fired prepreg had no sufficient hardness, was soft and bendable and the matrix crumbled and came off by application of small force although the prepreg plate was not delaminated. It is considered that the organic binder loses its ability to bind together the ceramic particles after it is decomposed and released in the firing at lower temperature under normal pressure. This suggests that such an organic binder is not suitable in the firing at lower temperature under normal pressure as employed in the present invention, that is, firing at higher temperature under high pressure as employed in the conventional slurry impreganation process.

In Comparative Example 6, there was flow observed in the matrix and was shapable and curable. But when the cured laminated prepreg was fired, the four layers were separated. This tells that the composition lacks binding ability and all the five components (A), (B), (C), (D) and (E) are essential in order to achieve the object of the present invention.

As has been apparent from the above described working examples and comparative examples, this invention enables commercial production of practicable ceramic articles reinforced with continuous fibers and has the following technical merits.

(1) The prepreg has good shapability and articles having complicated configuration can be easily produced.

(2) The prepreg can be cured at a relatively low temperature in one step and, therefore, the cured prepreg articles can be produced in short period of time.

(3) Firing can be carried out in air and under normal pressure and free standing condition almost without causing deformation and dimensional change.

(4) The obtained fired product is an integrated body free from delamination and is provided with practically feasible physical properties (such as strength, heat cycle property, etc.).

Ceramic articles reinforced with continuous fibers and provided with all the above characteristics and a process for preparing the same are not yet known today.

EFFECTS OF THE INVENTION

The prepreg of the present invention has excellent tack and drape and a long out-time. Therefore, the prepreg of this invention can be easily converted into laminated formed articles of large size and complicated configuration by the same procedures as employed concerning the widely used epoxy resin prepreg.

The cured prepreg articles which are obtained by heating the laminated formed prepreg bodies little or do not suffer dimensional change in the course of firing. The shape and the bonding between the inorganic fibers and matrix are well retained. Therefore, little or no delamination, surface cracking and formation of voids are observed. The cured prepreg articles of the present invention little suffer deformation when they are heated in air to 500° C. or higher temperatures under normal pressure and free standing condition. The cured prepreg articles of this invention can be converted to ceramic articles reinforced with inorganic fibers by baking it at a temperature not in excess of 1,200° C., at which no deterioration of the inorganic fibers occurs.

According to the densifying process of the present invention, the fired prepreg articles, which are ceramic bodies reinforced with inorganic fibers, are impregnated with the matrix composition liquid or similar liquid and re-fired to fill the voids formed during the firing, which improves the strength of the ceramic articles.

This invention easily enables commercial production of ceramic articles reinforced with inorganic fiber and solves the difficult technical problems such as 1) production of articles of a large size and complicated configuration; 2) prevention of reaction between fibers and matrix and deterioration of fibers, which happen at high temperature under high pressure; 3) prevention of cracking and formation of voids caused by the difference in thermal shrinkage or expansion between fibers and matrix.

Having described the invention, we claim:

1. Prepreg formed by impregnating tow or fabric of inorganic fibers with a matrix composition or thermally infiltrating the matrix composition into the tow or fabric, said matrix composition comprising:
   (A) 350–750 parts by weight of a fine powder of a metal oxide or oxides having an average particle diameter of not larger than 1 μm,
   (B) 80–170 parts by weight of a soluble siloxane polymer having double chain structure,
   (C) 25–125 parts by weight of a trifunctional silane compound having at least one ethylenically unsaturated double bond in the molecule thereof,
   (D) 1–4 parts by weight of an organic peroxide, and
   (E) 25–125 parts by weight of a radically polymerizable monomer having at least two ethylenically unsaturated double bonds.

2. Prepreg as claimed in claim 1, wherein the matrix composition comprises 350–750 parts by weight of the (A) component, 80–170 parts by weight of the (B) component, 25–125 parts by weight of the (C) component, 1–4 parts by weight of the (D) component, and 25–125 parts by weight of the (E) component.

3. Prepreg as claimed in claim 1, wherein the (A) component is an oxide or a multiple oxide comprising oxide or oxides of silicon, aluminum and titanium.

4. Prepreg as claimed in claim 1, the (B) component is polysilsesquioxane.

5. Prepreg as claimed in claim 4, wherein the (B) component is at least one selected from a group consisting of polyphenylsilsesquioxane, polyethylsilsesquioxane, polymethylsilsesquioxane and copolymer comprising these monomers.

6. Prepreg as claimed in claim 1, wherein the (C) component is gamma-(meth)acryloxyalkyltrialkoxysilane.

7. Prepreg as claimed in claim 1, wherein the (D) component is a peroxide whose temperature for obtaining a half life of 10 hours is not lower than 110° C.

8. Prepreg as claimed in claim 1, wherein the (E) component is a di(meth)acrylate of a polyhydric alcohol and/or a tri(meth)acrylate of a polyhydric alcohol.

9. Prepreg as claimed in claim 1, wherein the inorganic fibers are at least one kind of oxide inorganic fibers selected from a group consisting of glass fibers, alumina fibers, silica fibers, silicon-titanium oxy carbide fibers (Tyranno Fiber$^R$) and fibers mainly comprising alumina and/or silica.

10. Prepreg as claimed in claim 1, wherein the fibers are in the form of a bundle of tow, a sheet of unidirectionally aligned tow or a woven, knit, or non-woven sheet.

11. Process for preparing prepreg, which comprises dissolving and dispersing the components (A) 350–750 parts by weight of a fine powder of a metal oxide or oxides having an average particle diameter of not larger than 1 μm, (B) 80–170 parts by weight of a soluble siloxane polymer having double chain structure, (C) 25–125 parts by weight of a trifunctional silane compound having at least one ethylenically unsaturated double bond in the molecule thereof, (D) 1–4 parts by weight of an organic peroxide, and (E) 25–125 parts by weight of a radically polymerizable monomer having at least two ethylenically unsaturated double bonds in a solvent, impregnating tow or fabric or inorganic fibers with or applying to them the resulting liquid and removing at least part of the solvent.

12. Cured prepreg articles which are produced by laminating or forming the prepreg prepared according to the process of claim 11 into a shape, and heat-treating and pressing the formed prepreg at 120°–250° C. under a pressure of 2–10 kg/cm$^2$.

13. Process for preparing fired prepreg articles, comprising heating the cured prepreg articles of claim 12 to 500°–1,200° C.

14. Fired prepreg articles which are formed by the process of claim 13.

15. The process according to claim 13, wherein said heating step is carried out by raising the temperature at a temperature rise rate of not higher than 5° C./min up to 500° C. and thereafter heating up to a temperature of between 500° C. and 1200° C.

16. The process according to claim 13 wherein said heating step is carried out in air under normal pressure and free standing condition.

17. Fired prepreg articles which are formed by the process of claim 16.

18. Process for densifying fired prepreg articles prepared by the process of claim 13, comprising saturating a fired prepreg article with a composition containing components (A) 350–750 parts by weight of a fine powder of a metal oxide or oxides having an average particle diameter of not larger than 1 μm, (B) 80–170 parts by weight of a soluble siloxane polymer having double chain structure, (C) 25–125 parts by weight of a trifunctional silane compound having at least one ethylenically unsaturated double bond in the molecule thereof, (D) 1–4 parts by weight of an organic peroxide, and (E) 25–125 parts by weight of a radically polymerizable monomer having at least two ethylenically unsaturated double bonds, or a composition containing at least said (B) component and heating said articles to 500°–1,200° C. at least once.

19. Process for preparing prepreg, which comprises dissolving the components (A) 350–750 parts by weight of a fine powder of a metal oxide or oxides having an average particle diameter of not larger than 1 μm, (B) 80–170 parts by weight of a soluble siloxane polymer having double chain structure, (C) 25–125 parts by weight of a trifunctional silane compound having at least one ethylenically unsaturated double bond in the molecule thereof, (D) 1–4 parts by weight of an organic peroxide, and (E) 25–125 parts by weight of a radically polymerizable monomer having at least two ethylenically unsaturated double bonds in a solvent, removing part of the solvent from the mixture and thermally infiltrating the resulting concentrated composition into a bundle of tow or a sheet of inorganic fibers.

20. Process for preparing prepreg as claimed in claim 19, wherein the operation of infiltration of said composition is carried out by alternately placing a plurality of said bundles or sheets of inorganic fibers and sheets of said concentrated composition one on another and applying heat.

21. Cured prepreg articles which are produced by laminating or forming the prepreg prepared according to the process of claim 19 into a shape, and heat-treating and pressing the formed prepreg at 120°–250° C. under a pressure of 2–10 kg/cm$^2$.

* * * * *